US012599883B2

(12) United States Patent
Sleijster et al.

(10) Patent No.: US 12,599,883 B2
(45) Date of Patent: Apr. 14, 2026

(54) SCREENING ASSEMBLY AND PROCESS FOR SCREENING POLYMER FROM AN EFFLUENT STREAM AT REDUCED LEVELS OF POLYMER ENTRAINMENT

(71) Applicant: Borealis AG, Vienna (AT)

(72) Inventors: Henry Sleijster, Sittard-Geleen (NL); Mohammad Al-haj Ali, Porvoo (FI); Mubashar Sattar, Porvoo (FI); Noureddine Ajellal, Porvoo (FI); Charlotta Weber, Stockholm (SE)

(73) Assignee: BOREALIS GMBH, Vienna (AT)

( * ) Notice: Subject to any disclaimer, the term of this patent is extended or adjusted under 35 U.S.C. 154(b) by 590 days.

(21) Appl. No.: 18/018,149

(22) PCT Filed: Aug. 3, 2021

(86) PCT No.: PCT/EP2021/071622

§ 371 (c)(1),
(2) Date: Jan. 26, 2023

(87) PCT Pub. No.: WO2022/033918

PCT Pub. Date: Feb. 17, 2022

(65) Prior Publication Data

US 2023/0272126 A1      Aug. 31, 2023

(30) Foreign Application Priority Data

Aug. 13, 2020    (EP) .................................... 20190910

(51) Int. Cl.
B01J 8/00          (2006.01)
B01D 47/06        (2006.01)
(Continued)

(52) U.S. Cl.
CPC .............. B01J 8/005 (2013.01); B01D 47/06 (2013.01); B01J 8/0055 (2013.01); B01J 8/006 (2013.01); C08F 2/007 (2013.01); B01D 3/06 (2013.01)

(58) Field of Classification Search
CPC .......... B01J 8/005; B01J 8/0055; B01J 8/006; B01D 47/06; B01D 3/06; C08F 2/007
See application file for complete search history.

(56) References Cited

U.S. PATENT DOCUMENTS 5,521,264 A * 5/1996 Mehra ..................... C08F 6/005
                                                                          95/143
6,262,191 B1 * 7/2001 Hottovy ................... B01J 8/005
                                                                          526/64

(Continued)

FOREIGN PATENT DOCUMENTS

EP          1860125 A1     5/2006
WO     1999056854 A1     11/1999
(Continued)

*Primary Examiner* — Renee Robinson
(74) *Attorney, Agent, or Firm* — Lippes Mathias LLP

(57) ABSTRACT

A process for screening polymer from a polymer-lean vapor stream, whereby the process comprises the steps of separating an effluent stream comprising the polymer and a first mixture of hydrocarbons into a polymer-rich stream and the polymer-lean vapor stream; spraying a condensed vapor composition comprising a second mixture of hydrocarbons into the polymer-lean vapor stream via a condensed vapor composition stream; screening a screened condensed vapor composition stream comprising the polymer and the condensed vapor composition from the polymer-lean vapor stream.

14 Claims, 2 Drawing Sheets

A screening assembly according to the first preferred embodiment of the present invention.

(51) Int. Cl.
    *C08F 2/00*           (2006.01)
    *B01D 3/06*           (2006.01)

(56)              References Cited

U.S. PATENT DOCUMENTS

| | | | |
|---|---|---|---|
| 6,472,482 B1 * | 10/2002 | Evertz | B01J 8/006 |
| | | | 526/348.5 |
| 7,402,636 B1 | 7/2008 | Shaffer et al. | |
| 2008/0234447 A1 | 9/2008 | Shaffer et al. | |
| 2010/0047141 A1 | 2/2010 | Hnat | |
| 2018/0298119 A1 * | 10/2018 | Garner | B01J 8/006 |

FOREIGN PATENT DOCUMENTS

| | | | |
|---|---|---|---|
| WO | 2018236630 A2 | 12/2018 | |
| WO | 2019162445 A1 | 8/2019 | |

* cited by examiner

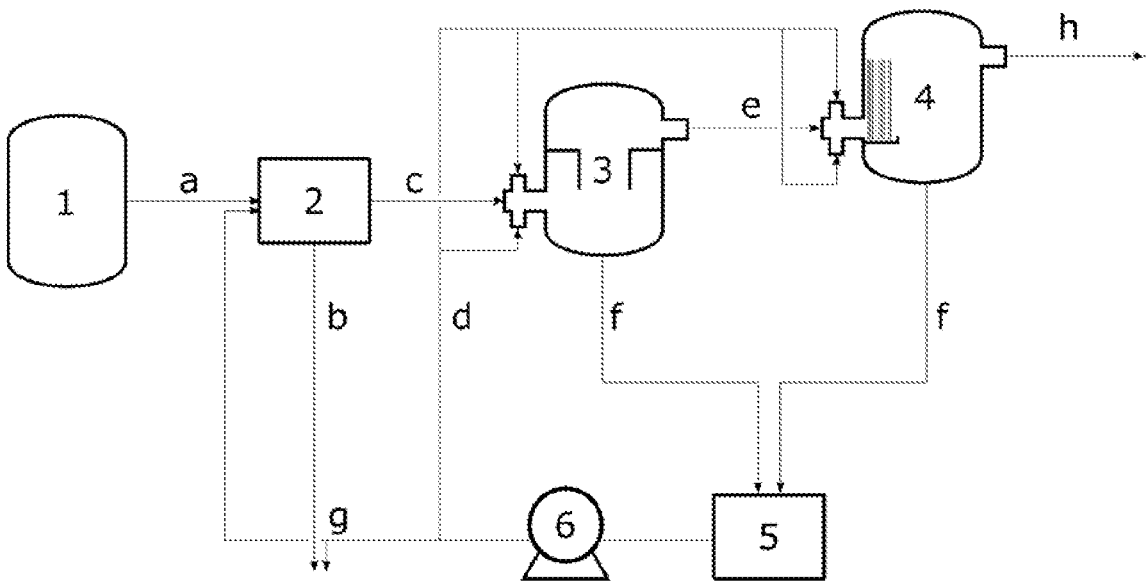
Figure 1: A screening assembly according to the first preferred embodiment of the present invention.
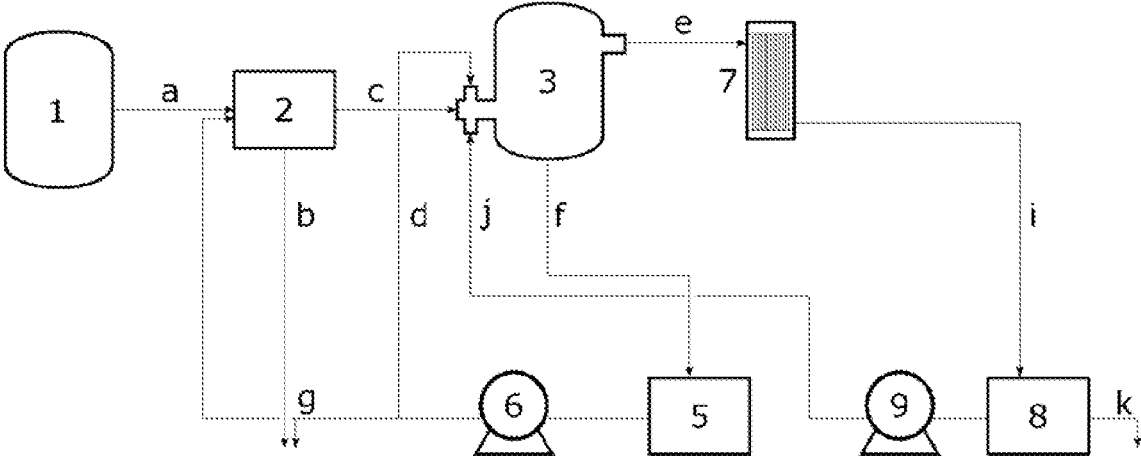
Figure 2: A screening assembly according to the second preferred embodiment of the present invention

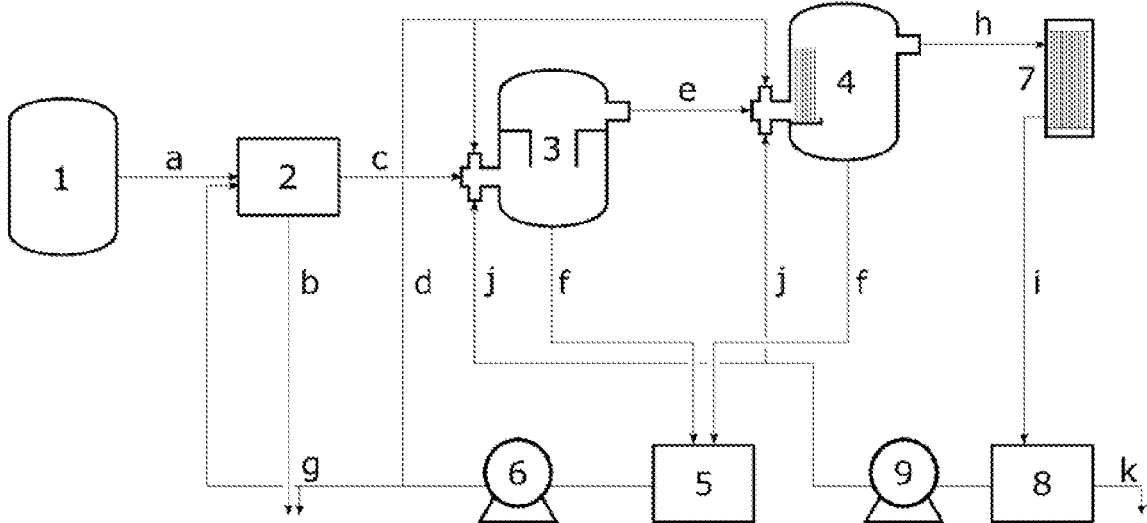
Figure 3: A screening assembly according to the third preferred embodiment of the present invention

SCREENING ASSEMBLY AND PROCESS FOR SCREENING POLYMER FROM AN EFFLUENT STREAM AT REDUCED LEVELS OF POLYMER ENTRAINMENT

CROSS REFERENCE TO RELATED APPLICATIONS

This is a 371 of PCT Application No. PCT/EP2021/071622, filed Aug. 3, 2021, which claims the benefit of European Application No. 20190910.8, filed Aug. 13, 2020, the contents of which are incorporated herein in their entirety.

The present invention is concerned with a screening assembly for screening polymer from an effluent stream withdrawn from a polymer reactor. Furthermore, the present invention is related to a process for separating polymer from said effluent stream. In particular, the screening assembly and the process can be used in solution polymerization processes.

BACKGROUND

Typically, in solution polymerization processes, reactors are operated with relatively low polymer concentrations in the reactor, whereby low polymer concentrations typically are considered to be lower than 30 wt % with respect to the total amount of polymer and a mixture of hydrocarbons, such as monomers, optional comonomers and solvent(s) used.

Furthermore, reactors in solution polymerization processes are typically operated at reactor temperatures higher than in gas phase polymerization processes. The advantage of higher temperatures are higher catalyst activities and, hence, better catalytic efficiency. However, the drawbacks are that in cases where the exothermic reaction is fast, too much heat is absorbed in the reaction mixture leading to the risk of uncontrolled reactions. To control such fast exothermic reactions and uncontrolled reactions, polymer concentrations are typically within 15 to 25 wt % leading to controlled exothermic heat production.

Therefore, as a result, the effluent stream comprises respective amounts of undesired and a mixture of hydrocarbons, such as solvent and unreacted monomers and optionally comonomers, which have to be removed from the polymer in process steps subsequently to the polymerization reaction step.

While solution polymerization processes known in the art vary in these subsequent process steps, nearly all of them typically make use of the following steps: a) heating the polymer melt solution under pressure and b) depressurizing the solution to let volatile compounds evaporate.

Typically, such solution polymerization processes are carried out under conditions, where the reactor pressures are higher than 50 barg and the temperature at the reactor outlet is higher than 150° C. In some of the solution polymerization technologies known from the prior art, in the subsequent step, the solution stream is heated up to above 200° C. followed by a pressure drop down to vacuum levels to produce the final polymer.

Typically, such separation is carried out in a fashion that a condensed stream and a vapor stream are formed, i.e. in a flash separator. In a typical reactor assembly or process, such vapor stream from said evaporation step is condensed and fed to recovery sections. For example, it can be reused as solvent and/or as a source for unreacted monomer and/or comonomer.

In certain applications of polymer, particularly low levels of volatiles in the polymer are needed, whereby volatiles can be inter alia represented by solvent molecules and/or unreacted monomers or comonomers still left in the produced polymer. To achieve such low volatile levels in the polymer, multi-step evaporation processes have been developed. In particular, it is known from the art that two- or three-step evaporation processes are at least needed to reach an acceptable low level of volatiles for certain market applications of the polymer in most cases with the help of additional equipment like a devolitization extruder or kneader as a last step.

Typically, also in each step of the multi-step processes, the vapor streams are subsequently condensed and may be reused as reactor feed of the process or feed to recovery sections, where a mixture of hydrocarbons, such as solvent, comonomer and monomer are separated beforehand.

Problem to be Solved

These vapor streams can comprise polymer, which has entrained the vapor stream during the separation step. As the pressure drop in the separation step is typically large, the separation occurs so fast that fine polymer particles might be withdrawn by the evaporating material and introduced into the vapor streams. It has turned out that in particular in the separation step, polymer entrainment occurs at high levels. This might be the case, as the amount of evaporating material is largest in the separation step.

Fouling in the equipment subsequent to the separation step(s) can lead to reduced heat removal and reduced separation efficiency of the process section/equipment. This is in particular problematic for condensers used in subsequent steps to condense said vapor streams. The heat removal efficiency of such condensers can be significantly reduced by fouling. Therefore, in cases where the vapor streams are reused as feed for the reactor, fouling of said equipment could even have an impact on temperature control of the polymerization process and the production capacity of the unit. Therefore, a suitable protection against the fouling effect of polymer entrainment in the vapor streams of vapor phase/condensed phase separation steps subsequent to polymerization processes, in particular solution polymerization, is needed.

OBJECT OF THE INVENTION

In view of the problem as set out above, it is one object of the present invention to provide a screening assembly comprising a separation device, in particular a vapor phase/condensed phase separation device, for separating the effluent stream, such as from a polymerization reactor, in particular such as from a solution polymerization reactor, with reduced or preferably eliminated polymer entrainment into the separated vapor phase or vapor phases.

Furthermore, also in view of the problems as described above, it is a second object of the present invention to provide a process for separating an effluent stream, for example from a polymerization process, in particular for example from a solution polymerization process, into a vapor stream and a condensed stream, whereby polymer entrainment into the vapor stream is reduced or preferably eliminated.

SUMMARY OF THE INVENTION

It now has surprisingly been found out that the above-mentioned objects can be achieved by combining the separation step with at least one first screening step, wherein the vapor phase of the separation step is lead into the first screening step and by spraying a condensed phase comprising a mixture of hydrocarbons into the vapor stream withdrawn from the separation step before said vapor stream entering the first screening step.

Therefore, the present invention relates to a process for separating polymer from an effluent stream comprising the polymer and a first mixture of hydrocarbons, whereby the process comprises the steps of:

A) separating the effluent stream into a polymer-rich stream and a polymer-lean vapor stream;

B) spraying a condensed vapor composition stream comprising a condensed vapor composition comprising a second mixture of hydrocarbons into the polymer-lean vapor stream;

C) screening the polymer-lean vapor stream to obtain a screened condensed vapor composition stream comprising the polymer and the condensed vapor composition.

Furthermore, the present invention relates to a screening assembly comprising a separating device fluidly connected to a conduit for an effluent stream comprising a polymer and a mixture of hydrocarbons, wherein the separating device is configured to separate the effluent stream into a polymer-rich stream and a polymer-lean vapor stream, wherein the separating device comprises an inlet, a first outlet for withdrawing the polymer-rich stream, and a second outlet for withdrawing the polymer-lean vapor stream, and a first screening device connected to the second outlet of the separating device via a conduit for the polymer-lean vapor stream, wherein the first screening device is configured to spray condensed vapor composition comprising the mixture of hydrocarbons into the polymer-lean vapor stream via a conduit for a condensed vapor composition stream and to screen a screened condensed vapor composition stream comprising the polymer and the condensed vapor composition from the polymer-lean vapor stream, wherein the first screening device comprises an inlet, a first outlet for withdrawing a condensed phase and a second outlet for withdrawing a vapor phase.

Finally, the present invention is directed to the use of such a screening assembly for reducing fouling in a polymerization process, preferably a solution polymerization process.

Definitions

The term spraying as used herein has to be understood as a process step, in which a condensed phase is introduced into a gaseous phase. Thereby the condensed phase is split up in multiple droplets. This is usually done by at least one nozzle. Spraying has to be understood as a process step in which a two phase system is formed (gaseous/condensed) having a phase separating surface as high as possible.

The term condensation point as used herein has to be understood as a combination of conditions, which lead to condensation of compounds from a vaporized mixture. In particular, the condensation point depends on the pressure and the temperature of the system. By varying either or both of these parameters, the condensation point can be reached.

The expression volatiles or volatile compounds as used herein has to be understood as compounds having significantly lower molecular weight in comparison to the polymer produced in the process of the invention. Such compounds typically are present in the gaseous form when being exposed to a flash separator. Commonly, the volatile compounds are a mixture of volatile hydrocarbons. Preferably the mixture of volatile hydrocarbons comprises at least one unreacted monomer, optionally unreacted comonomer, solvent(s) and any other gaseous components present in the effluent stream.

Flash separators have been known in the prior art for decades (also as low-pressure separators). As it is well known in the art, a liquid feed is passed to a flash vessel operated at a reduced pressure. Thereby a part of the liquid phase vaporizes and can be withdrawn as an overhead stream (or a vapor stream) from the low pressure separator. The part remaining in liquid phase is then withdrawn as a bottom stream or a liquid stream from the flash vessel. Operating the low pressure separator under conditions such that both vapor and liquid phases are present in the flash vessel describes this situation.

Gravity separators as used herein comprise a vessel in which a two-phase (gas/solid) system can be separated. The gaseous phase with the lower relative density (polymer-lean phase) is withdrawn from the upper end of the vessel whereas the solid phase with the higher relative density (in the present case the polymer-rich phase) is withdrawn from the bottom end of the vessel.

The term separation efficiency as used herein is defined as the mass flow of the component withdrawn in the polymer-lean stream or vapor stream divided by the (theoretical) mass flow rate of the component in the polymer-lean stream or condensed stream in equilibrium conditions.

The term 'screening' as used herein denotes the process of removing partially or fully solids from fluids.

DESCRIPTION OF THE DRAWINGS

FIG. 1 shows a schematic layout of a screening assembly and a process according to the first preferred embodiment of the present invention including a cyclone and a subsequent filter.

FIG. 2 shows a schematic layout of a screening assembly and a process according to the second preferred embodiment of the present invention including a first screening device, whereas the vapor stream from the second outlet of this first screening device is condensed and reintroduced into the stream entering the first screening device by spraying.

FIG. 3 shows a schematic layout of a screening assembly and a process according to the third preferred embodiment of the invention representing a combination of the first and the second preferred embodiments shown in FIGS. 1 and 2.

REFERENCE SIGNS 1 polymerization reactor
2 separating device
3 first screening device
4 second screening device
5 condensed vapor composition vessel
6 first pump
7 condenser
8 filtered condensed vapor stream vessel
9 second pump
a effluent stream (leaving the polymerization reactor (1))
b polymer rich stream
c polymer-lean vapor stream
d condensed vapor composition stream
e first screened vapor stream
f screened condensed vapor composition stream
g condensed vapor purge stream
h second screened vapor stream
i filtered condensed vapor stream j spraying condensed vapor stream
k filtered condensed vapor purge stream

DETAILED DESCRIPTION OF THE INVENTION

In the following, the invention is described in detail based on the Figures and the embodiments found therein.
Screening Assembly According to the Invention In the most general embodiment of the invention, a screening assembly is provided comprising a separating device (2) fluidly connected to a conduit for an effluent stream (a) comprising a polymer and a mixture of hydrocarbons, wherein the separating device (2) is configured to separate the effluent stream (a) into a polymer-rich stream (b) and a polymer-lean vapor stream (c), wherein the separating device (2) comprises an inlet, a first outlet for withdrawing the polymer-rich stream (b), and a second outlet for withdrawing the polymer-lean vapor stream (c), a first screening device (3) connected to the second outlet of the separating device (2) via a conduit for the polymer-lean vapor stream (c), wherein the first screening device (3) is configured to spray condensed vapor composition comprising the mixture of hydrocarbons into the polymer-lean vapor stream (c) via a conduit for a condensed vapor composition stream (d) and to screen a screened condensed vapor composition stream (f) comprising the polymer and the condensed vapor composition from the polymer-lean vapor stream (c), wherein the first screening device (3) comprises an inlet, a first outlet for withdrawing a condensed phase and a second outlet for withdrawing a vapor phase. Preferably, the mixture of hydrocarbons comprises the solvent, unreacted monomer and/or comonomer.

Preferably, the vapor stream produced in the separating device (2) is overheated. This is due to the conditions typically used in such separation steps. Preferably, temperatures used in the separating device (2) are between 10° and 400° C., preferably between 13° and 300° C., more preferably between 17° and 250° C. Furthermore, the pressure drop with relation to the pressure in the effluent stream (a) is preferably more than 30 barg, preferably more than 60 barg and most preferably more than 90 barg. Hence, the conditions as found in the polymer-lean vapor stream (c) are set that the mixture of hydrocarbons, i.e. the solvent, unreacted monomer and/or comonomer, is not at its condensation point. Therefore, the mixture of compounds in the polymer-lean vapor stream (c) is preferably found in gaseous form.

It has now been found out that by spraying condensed vapor composition comprising the mixture of hydrocarbons into the polymer-lean vapor stream (c), entrainment into the first screened vapor stream of the first screening device can be significantly reduced. Without being bound to theory it is believed that the condensed phase adheres to the polymer particles and makes them heavier. Therefore, they entrain less into the vapor phase. Furthermore, the high temperature of the condensed phase prevents "sticking" of high concentration polymer to the walls or internals of the equipment. It is further believed that the spraying has two effects. First, the condensed phase itself already provides said effect. Second, the mixture found in the polymer-lean vapor stream (c) is cooled down to eventually reach its condensation point. Therefore, even more condensed phase is produced further enhancing the effect of reducing the entrainment.

Preferably, the effluent stream is withdrawn from a polymerization reactor (1), more preferably from a solution polymerization reactor.

Preferably, the separating device (2) can be any separating device, which is suitable to separate the effluent stream from the polymerization reactor into a polymer-lean vapor stream and a polymer rich stream. More preferably, the separating device (2) is a flash separator.

Likewise, the first screening device (3) can be any screening device, which is suitable to screen the polymer in the polymer-lean vapor stream (c) of the separating device (2) from the gaseous components in the stream. Preferably, the first screening device (3) is configured for gravity separation. Even more preferably, the first screening device (3) is a cyclone. As it has turned out that after the separation step, i.e. after the separating device (2), the polymer entrainment is still high in the polymer-lean step, it has been found out that gravity separating and in particular a cyclone are most effective in terms of separation efficiency.

In another preferable embodiment of the invention, the first screening device (3) is a filter. In one embodiment of the invention, the filter (4) comprises a lamella clarifier. In another embodiment of the invention, the filter (4) comprises a demister. In an even more preferred embodiment, the filter (4) comprises both a lamella clarifier and a demister. Most preferably the lamella clarifier and the demister are positioned so that the demister is used subsequently to the lamella clarifier.

There are two advantages of a lamella clarifier. First, it has a compact design, which saves more than 85% of space compared to conventional sedimentation tanks. Second, is has no moving parts. Therefore, it almost needs no maintenance at all and is a low-energy system.

The advantage of the demister is that it is adequate for all gas-liquid flow regimes over a wide range of gas flow rates. It generally has a simple structure and relatively large surface area. Furthermore, it causes a low pressure drop.

It was found that only one first screening device is not yet giving enough efficiency in removing the entrained polymer. Therefore, in a preferred embodiment, the screening assembly further comprises a second screening device (4), which comprises an inlet, a first outlet for withdrawing a condensed phase and a second outlet for withdrawing a vapor phase.

In parallel to the first screening device (3), the second screening device (4) can be any screening device, which suitable to separate the polymer still entrained in the first screened vapor stream of the first screening device (3) from the gaseous components in the stream. Preferably, also the second screening device (4) is configured for gravity separation. Even more preferably, the second screening device (4) is a cyclone.

In another preferable embodiment of the invention, the second screening device (4) is a filter. In one embodiment of the invention, the filter (4) comprises a lamella separator. In another embodiment of the invention, the filter (4) comprises a demister. In an even more preferred embodiment, the filter (4) comprises both a lamella separator and a demister.

The second (3) and the second screening (4) device can be used in any combination, i.e. two cyclones, two filters, a cyclone and filter or vice versa. However, most preferably, in the screening assembly of the present invention, the first screening device (3) is a cyclone and the second screening device (4) is a filter. This combination assures the highest separation efficiency. In such an embodiment, the inlet of filter (4) is preferably connected to the second outlet of the cyclone (3) via a conduit for a first screened vapor stream (e). Furthermore, in such an embodiment, a second screened vapor stream (h) is withdrawn from the second screening device (4).

Furthermore, preferably, the first outlet for withdrawing a condensed phase of the first screening device (3) can be connected to the condensed vapor composition stream (d) via a conduit for a screened condensed vapor composition stream (f). In such an arrangement, the condensed phase of the first screening device (3) is reused, increasing energy efficiency and reducing costs of the overall process.

Likewise, preferably, the first outlet for withdrawing a condensed phase of the second screening device (4) can be connected to the condensed vapor composition stream (d) via a conduit for a screened condensed vapor composition stream (f).

Even more preferably, the screening assembly further comprises a condensed vapor composition vessel (5), into which the screened condensed vapor composition stream (f) is introduced and from which the condensed vapor composition stream (d) is withdrawn. More preferably, from the condensed vapor composition stream (d) a condensed vapor purge stream (g) is withdrawn. The condensed vapor composition vessel (5) forms a reservoir for the condensed vapor composition, which further ensures reliable operability of the screening assembly.

In a preferred embodiment, the condensed vapor purge stream (g) is connected to the separating device (2) by bringing the condensed vapor composition back to its boiling point for evaporation in separating device (2). Polymers are recycled in this way by the separating device, preventing extra work, energy and costs.

Preferably, the screening assembly comprises a first pump (6) for compressing the condensed vapor composition stream (d). Usually, the condensed vapor composition must again be compressed to match the pressure as found in the polymer-lean vapor stream (c) as withdrawn from the separating device (2) before being sprayed into the condensed vapor composition stream (d).

First Preferred Embodiment of the Screening Assembly (FIG. 1)

Hence, in summary, the first preferred embodiment of the invention relates to
  a screening assembly comprising
  a flash separator (2) fluidly connected to the polymerization reactor (1) via a conduit for an effluent stream (a) comprising a polymer and a mixture of hydrocarbons, wherein the flash separator (2) is configured to separate the effluent stream (a) into a polymer-rich stream (b) and a polymer-lean vapor stream (c), wherein the flash separator (2) comprises an inlet, a first outlet for withdrawing the polymer-rich stream (b), and a second outlet for withdrawing the polymer-lean vapor stream (c),
  a cyclone (3) connected to the second outlet of the flash separator (2) via a conduit for the polymer-lean vapor stream (c), wherein the cyclone (3) is configured to spray condensed vapor composition comprising the mixture of hydrocarbons into the polymer-lean vapor stream (c) via a conduit for a condensed vapor composition stream (d) and to screen a screened condensed vapor composition stream (f) comprising the polymer and the condensed vapor composition from the polymer-lean vapor stream (c), wherein the cyclone (3)

comprises an inlet, a first outlet for withdrawing a condensed phase and a second outlet for withdrawing a vapor phase,
  a filter (4), which comprises an inlet, a first outlet for withdrawing a condensed phase and a second outlet for withdrawing a vapor phase; wherein the inlet of filter (4) is connected to second outlet of the cyclone (3) via a conduit for a first screened vapor stream (e),
  wherein the first outlet for withdrawing a condensed phase of the cyclone (3) is connected to the condensed vapor composition stream (d) via a conduit for a screened condensed vapor composition stream (f),
  wherein the first outlet for withdrawing a condensed phase of the filter (4) is connected to the condensed vapor composition stream (d) via a conduit for a screened condensed vapor composition stream (f),
  wherein the screening assembly further comprises a condensed vapor composition vessel (5), into which the screened condensed vapor composition stream (f) is introduced and from which the condensed vapor composition stream (d) is withdrawn,
  wherein from the condensed vapor composition stream (d) a condensed vapor purge stream (g) is withdrawn and fed to the separating device (2),
  wherein the screening assembly comprises a first pump (6) for compressing the condensed vapor composition stream (d).

Preferably, the effluent stream is withdrawn from a polymerization reactor (1), more preferably from a solution polymerization reactor.

Preferably, the screening assembly of the present invention further comprises a condenser (7) comprising an inlet and an outlet, wherein the inlet of the condenser (7) is connected to the second outlet of the first screening device (3) and/or to the second outlet of the second screening device (4). In such an embodiment, the first and second screened vapor streams can again be transformed into a condensed form. In case these streams should again be used for applications, which afford a condensed form, such as spraying, such condensation is necessary.

Furthermore, preferably, the outlet of the condenser (7) is connected to the inlet of the second (3) and/or the second screening device (4) via a conduit for the spraying condensed vapor stream (j) and wherein the first screening device (3) and/or the second screening device (4) is/are configured to spray the spraying condensed vapor stream (j) into the polymer-lean vapor stream (c). In such an arrangement, the condensed phase of the first screening device (3) and/or the second screening device (4) can be reused, increasing energy efficiency and reducing costs of the overall process. An additional advantage is that the polymer concentration can be controlled via the feed of the spraying condensed vapor stream (j) versus the feed of the condensed vapor purge stream (g) to prevent too high polymer content.

Preferably, the screening assembly further comprises a filtered condensed vapor stream vessel (8), into which a filtered condensed vapor stream (i) connected to the outlet of the condenser (7) is introduced and from which the spraying condensed vapor stream (j) is withdrawn. Also the filtered condensed vapor stream vessel (8) forms a reservoir for the filtered condensed vapor stream, which further ensures reliable operability of the screening assembly.

Preferably, from the filtered condensed vapor stream vessel (8) a filtered condensed vapor purge stream (k) is withdrawn.

Preferably, the screening assembly of the present invention further comprises a second pump (9) for compressing the spraying condensed vapor stream (j). In case these streams should again be used for applications, which afford a condensed form, such as spraying, such condensation is necessary.

Second Preferred Embodiment of the Screening Assembly (FIG. 2)

Therefore, in summary, a second preferred embodiment of the invention as depicted in FIG. 2 relates to a screening assembly comprising a separating device (2) fluidly connected to the polymerization reactor (1) via a conduit for an effluent stream (a) comprising a polymer and a mixture of hydrocarbons, wherein the separating device (2) is configured to separate the effluent stream (a) into a polymer-rich stream (b) and a polymer-lean vapor stream (c), wherein the separating device (2) comprises an inlet, a first outlet for withdrawing the polymer-rich stream (b), and a second outlet for withdrawing the polymer-lean vapor stream (c), a first screening device (3) connected to the second outlet of the separating device (2) via a conduit for the polymer-lean vapor stream (c), wherein the first screening device (3) is configured to spray condensed vapor composition comprising the mixture of hydrocarbons into the polymer-lean vapor stream (c) via a conduit for a condensed vapor composition stream (d) and to screen a screened condensed vapor composition stream (f) comprising the polymer and the condensed vapor composition from the polymer-lean vapor stream (c), wherein the first screening device (3) comprises an inlet, a first outlet for withdrawing a condensed phase and a second outlet for withdrawing a vapor phase, wherein the first outlet for withdrawing a condensed phase of the first screening device (3) is connected to the condensed vapor composition stream (d) via a conduit for a screened condensed vapor composition stream (f), the screening assembly further comprising a condensed vapor composition vessel (5), into which the screened condensed vapor composition stream (f) is introduced and from which the condensed vapor composition stream (d) is withdrawn, wherein from the condensed vapor composition stream (d) a condensed vapor purge stream (g) is withdrawn and fed to the separating device (2), the screening assembly further comprising a first pump (6) for compressing the condensed vapor composition stream (d), the screening assembly further comprising a condenser (7) comprising an inlet and an outlet, wherein the inlet of the condenser (7) is connected to the second outlet of the first screening device (3), the screening assembly further comprising a filtered condensed vapor stream vessel (8), into which a filtered condensed vapor stream (i) connected to the outlet of the condenser (7) is introduced and from which the spraying condensed vapor stream (j) is withdrawn, wherein the outlet of the condenser (7) is connected to the inlet of the first screening device (3) via a conduit for the spraying condensed vapor stream (j) and wherein the first screening device (3) is configured to spray the spraying condensed vapor stream (j) into the polymer-lean vapor stream (c), and the screening assembly further comprising a second pump (9) for compressing the spraying condensed vapor stream (j).

Preferably, the effluent stream is withdrawn from a polymerization reactor (1), more preferably from a solution polymerization reactor.

Third Preferred Embodiment of the Screening Assembly (FIG. 3)

A third preferred embodiment represents the combination of a setup comprising a cyclone and a filter in that order represented by the first preferred embodiment and the equipment for reusing the screened vapor streams of the cyclone and the filter.

Hence, in summary, the third preferred embodiment of the invention relates to a screening assembly comprising a flash separator (2) fluidly connected to a conduit for an effluent stream (a) comprising a polymer and a mixture of hydrocarbons, wherein the flash separator (2) is configured to separate the effluent stream (a) into a polymer-rich stream (b) and a polymer-lean vapor stream (c), wherein the flash separator (2) comprises an inlet, a first outlet for withdrawing the polymer-rich stream (b), and a second outlet for withdrawing the polymer-lean vapor stream (c), a cyclone (3) connected to the second outlet of the flash separator (2) via a conduit for the polymer-lean vapor stream (c), wherein the cyclone (3) is configured to spray condensed vapor composition comprising the mixture of hydrocarbons into the polymer-lean vapor stream (c) via a conduit for a condensed vapor composition stream (d) and to screen a screened condensed vapor composition stream (f) comprising the polymer and the condensed vapor composition from the polymer-lean vapor stream (c), wherein the cyclone (3) comprises an inlet, a first outlet for withdrawing a condensed phase and a second outlet for withdrawing a vapor phase, a filter (4), which comprises an inlet, a first outlet for withdrawing a condensed phase and a second outlet for withdrawing a vapor phase; wherein the inlet of filter (4) is connected to second outlet of the cyclone (3) via a conduit for a first screened vapor stream (e), wherein the first outlet for withdrawing a condensed phase of the cyclone (3) is connected to the condensed vapor composition stream (d) via a conduit for a screened condensed vapor composition stream (f), wherein the first outlet for withdrawing a condensed phase of the filter (4) is connected to the condensed vapor composition stream (d) via a conduit for a screened condensed vapor composition stream (f), wherein the screening assembly further comprises a condensed vapor composition vessel (5), into which the screened condensed vapor composition stream (f) is introduced and from which the condensed vapor composition stream (d) is withdrawn, wherein from the condensed vapor composition stream (d) a condensed vapor purge stream (g) is withdrawn and fed to the separating device (2), wherein the screening assembly comprises a first pump (6) for compressing the condensed vapor composition stream (d), the screening assembly further comprising a condenser (7) comprising an inlet and an outlet, wherein the inlet of the condenser (7) is connected to the second outlet of the cyclone (3) and/or to the second outlet of the filter (4), the screening assembly further comprising a filtered condensed vapor stream vessel (8), into which a filtered condensed vapor stream (i) connected to the outlet of the condenser (7) is introduced and from which the spraying condensed vapor stream (j) is withdrawn, wherein the outlet of the condenser (7) is connected to the inlet of cyclone (3) and/or the inlet of the filter (4) via a conduit for the spraying condensed vapor stream (j) and wherein the cyclone (3) and the filter (4) are configured to spray the spraying condensed vapor stream (j) into the polymer-lean vapor stream (c), the screening assembly further comprising a filtered condensed vapor stream vessel (8), into which a filtered condensed vapor stream (i) connected to the outlet of the condenser (7) is introduced and from which the spraying condensed vapor stream (j) is withdrawn, and the screening assembly further comprising a second pump (9) for compressing the spraying condensed vapor stream (j).

Preferably, the effluent stream is withdrawn from a polymerization reactor (1), more preferably from a solution polymerization reactor.

Process According to the Invention

The process of the present invention is directed to separating polymer from an effluent stream (a) comprising a polymer and a mixture of hydrocarbons, preferably at least one solvent, and at least one monomer.

Polymerization Process

The effluent stream could be prepared using any process for the production of a polymer, which requires the subsequent separation of volatile compounds from the polymer after production. Preferably, the present invention is applicable for supercritical, solution and advanced solution polymerization processes. More preferably are continuous supercritical, solution and advanced solution polymerization processes. Most preferably, the production process comprises a continuous solution polymerization process.

The polymer produced in the present invention can be any polymer, for the production of which volatile compounds are used. Preferably, the polymer produced in the present invention is an olefin homo- or copolymer. More preferably, the monomer of this polymer is selected from an α-olefin having a carbon atom number of 2 to 4, preferably ethylene, propylene, 1-butene, most preferably from ethylene. Most preferably, the polymer is a polyethylene copolymer or homopolymer.

In case the polymer is a copolymer, the comonomer preferably is different from the α-olefin monomer and is selected from the group consisting of linear and cyclic olefins and α-olefins having from 2 to 12 carbon atoms and mixtures thereof. More preferably, the comonomer is an α-olefin different from the olefin monomer and is selected from the group consisting of linear olefins having from 2 to 12 carbon atoms and mixtures thereof, preferably 4 to 10 carbon atoms, most preferably 1-octene.

In a most preferred embodiment, the polymer is produced in a solution polymerization process as disclosed in the following.

The polymerization is typically conducted in the presence of an olefin polymerization catalyst. The olefin polymerization catalyst may be any catalyst known in the art, which is capable of polymerizing the monomer and the optional comonomer. Thus, the polymerization catalyst may be a Ziegler-Natta catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244, or it may be a combination of these. Other suitable catalysts, such as late transition metal catalysts, can also be used.

In a solution polymerization process a solvent is also present. The solvent is in liquid or supercritical state in the polymerization conditions. The solvent is typically and preferably a hydrocarbon solvent. The liquid hydrocarbon solvent used is preferably a $C_{5-12}$-hydrocarbon, which may be unsubstituted or substituted by $C_{1-4}$ alkyl group such as pentane, methyl pentane, hexane, heptane, octane, cyclohexane, methylcyclohexane and hydrogenated naphtha. More preferably, unsubstituted $C_{6-10}$-hydrocarbon solvents are used.

Other components may also be added into the reactor. It is known to feed hydrogen into the reactor for controlling the molecular weight of the polymer formed during the polymerization. The use of different antifouling compounds is also known in the art. In addition, different kinds of activity boosters or activity retarders may be used for controlling the activity of the catalyst.

Typically, the content of the polymer in the effluent stream comprising the solvent, the polymer and the unreacted monomer and optionally comonomer is from 10 to 35 wt %, preferably from 12.5 to 30 wt %, more preferably from 15 to 25 wt %.

The effluent stream is the feed stream to the separating device. It may be the product stream from the polymerization reactor, as discussed above. The reaction mixture stream then typically has the polymer content, composition temperature and pressure as disclosed above.

The effluent stream comprises the polymer, at least one unreacted monomer, and optionally at least one unreacted comonomer. Depending on the polymerization process the reaction mixture may further comprise at least one solvent.

Screening Process

In the most general embodiment of the invention, a process is provided for screening polymer from a polymer-lean vapor stream (a), whereby the process comprises the steps of:

A) separating the effluent stream (a) comprising the polymer and a first mixture of hydrocarbons into a polymer-rich stream (b) and the polymer-lean vapor stream (c);

B) spraying a condensed vapor composition stream (d) comprising a condensed vapor composition comprising the mixture of hydrocarbons into the polymer-lean vapor stream (c);

C) screening the polymer-lean vapor stream (c) to obtain a screened condensed vapor composition stream (f) comprising the polymer and the condensed vapor composition.

Preferably, the effluent stream (a) is withdrawn from a polymerization reaction step. Preferably, the mixture of hydrocarbons comprises the solvent, unreacted monomer and/or comonomer Preferably, the polymer-lean vapor stream produced in step A) is overheated. This is due to the conditions typically used in such separation steps. Preferably, step A) is carried out under conditions to allow volatile compounds in the effluent stream to evaporate from the condensed phase, which mainly comprises polymer. Preferably, temperatures used in step A) are between 10° and 400° C., more preferably between 13° and 300° C., even more preferably between 17° and 250° C. Furthermore, the pressure drop with relation to the pressure in the effluent stream (a) is preferably more than 30 barg, preferably more than 60 barg and most preferably more than 90 barg. Hence, the conditions as found in the polymer-lean vapor stream (c) are set that the mixture of hydrocarbons, i.e. the solvent, unreacted monomer and/or comonomer, is not at its condensation point. Therefore, the mixture of compounds in the polymer-lean vapor stream (c) is generally found to be present in gaseous form.

It has now surprisingly been found out that spraying condensed vapor composition comprising the mixture of hydrocarbons into the polymer-lean vapor stream (c), entrainment of polymer can be significantly reduced.

Therefore, preferably, step A) is carried out using a flash separator.

Preferably, the polymer in the effluent stream is molten. This assures best material exchange of volatile compounds evaporating from the polymer in step A).

Preferably, step C) comprises gravity separating the screened condensed vapor composition stream (f) from the polymer-lean stream (c). Gravity separation can be carried out using any gravity separating method known in the art and applicable to polymer separation. However, most preferred are cyclones and filters. Hence, more preferably, step C) is carried out using a cyclone (3). Likewise, in a parallel more preferable embodiment, step C) is carried out using a filter (4).

Step C) can also be carried out using cyclone (3) and filter (4) in combination, i.e. two cyclones, two filters, a cyclone and a filter or vice versa. However, most preferably, step C) is carried out using a cyclone (3) and subsequently a filter (4). This combination assures the highest separation efficiency.

In case step C) is carried out using a cyclone (3) and a filter (4) in that order, preferably the vapor phase of the cyclone (3) is introduced into the filter (4) via a first screened vapor stream (e).

Preferably, in step C) the filter (4) comprises a lamella separator and/or a demister. More preferably, in step C) the filter (4) comprises a lamella separator and a demister.

In a preferred embodiment of the invention, in step C) the screened condensed vapor composition stream (f) is reintroduced in step B) via the condensed vapor composition stream (d). In such an arrangement, the condensed phase of step (c), e.g. from the cyclone (3) and/or the filter (4) is reused, increasing energy efficiency and reducing costs of the overall process.

Furthermore, preferably, in step C) the screened condensed vapor composition stream (f) is introduced into a condensed vapor composition vessel (5) and the condensed vapor composition stream (d) is withdrawn from the condensed vapor composition vessel (5). The condensed vapor composition vessel (5) forms a reservoir for the condensed vapor composition, which further ensures reliable operability of the screening assembly. More preferably, in step C) from the condensed vapor composition stream (d) a condensed vapor composition purge stream (g) is withdrawn. In a preferred embodiment, the condensed vapor purge stream (g) is at least partially again introduced into step A) by bringing the condensed vapor composition back to its boiling point for evaporation in separating device (2). Polymers are recycled in this way by the separating device, preventing extra work, energy and costs.

Moreover, more preferably, in step C) the condensed vapor composition stream (d) is compressed using a first pump (6).

First Preferred Embodiment of the Screening Process (FIG. 1)

Hence, in summary, the first preferred embodiment of the invention relates to a process for screening polymer from a polymer-lean vapor stream, whereby the process comprises the steps of:

A) separating the effluent stream (a) comprising the polymer and a first mixture of hydrocarbons into a polymer-rich stream (b) and the polymer-lean vapor stream (c);

B) spraying a condensed vapor composition stream (d) comprising a condensed vapor composition comprising a second mixture of hydrocarbons into the polymer-lean vapor stream (c) via;

C) screening the polymer-lean vapor stream (c) to obtain a screened condensed vapor composition stream (f) comprising the polymer and the condensed vapor composition, wherein step A) is carried out using a flash separator, wherein step C) is carried out using a cyclone (3) and a filter (4) in that order, wherein the vapor phase of the cyclone (3) is introduced into the filter (4) via a first screened vapor stream (e).

wherein in step C) the screened condensed vapor composition stream (f) is reintroduced in step B) via the condensed vapor composition stream (d), wherein in step C) the screened condensed vapor composition stream (f) is introduced into a condensed vapor composition vessel (5) and the condensed vapor composition stream (d) is withdrawn from the condensed vapor composition vessel (5), wherein in step C) from the condensed vapor composition stream (d) a condensed vapor composition purge stream (g) is withdrawn and at least partially reintroduced into step A), and wherein in step C) the condensed vapor composition stream (d) is compressed using a first pump (6).

Preferably, the effluent stream (a) is withdrawn from a polymerization reaction step.

Preferably, in step C) a first screened vapor stream (e) withdrawn from the first screening device (3) and/or a second screened vapor stream (h) withdrawn from the second screening device (4) is/are condensed by a condenser (7) yielding a filtered condensed vapor stream (i), which is reintroduced in step B) by spraying a spraying condensed vapor stream (j).

Preferably, in step C) the filtered condensed vapor stream (i) is introduced into a filtered condensed vapor stream vessel (8) and the spraying condensed vapor stream (j) is withdrawn from the filtered condensed vapor stream vessel (8).

Preferably, in step C) from the filtered condensed vapor stream vessel (8) a filtered condensed vapor purge stream (k) is withdrawn.

Preferably, in step C) the spraying condensed vapor stream (j) is compressed using a second pump (9).

Second Preferred Embodiment of the Screening Process (FIG. 2)

Therefore, in summary, the second preferred embodiment of the invention as depicted in FIG. 2 relates to a process for screening polymer from a polymer-lean vapor stream, whereby the process comprises the steps of:

A) separating the effluent stream (a) the polymer and a first mixture of hydrocarbons into a polymer-rich stream (b) and the polymer-lean vapor stream (c);

B) spraying a condensed vapor composition stream (d) comprising a condensed vapor composition comprising a second mixture of hydrocarbons into the polymer-lean vapor stream (c);

C) screening the polymer-lean vapor stream (c) to obtain a screened condensed vapor composition stream (f) comprising the polymer and the condensed vapor composition, wherein step A) is carried out using a flash separator, wherein in step C) the screened condensed vapor composition stream (f) is reintroduced in step B) via the condensed vapor composition stream (d), wherein in step C) the screened condensed vapor composition stream (f) is introduced into a condensed vapor composition vessel (5) and the condensed vapor composition stream (d) is withdrawn from the condensed vapor composition vessel (5), wherein in step C) from the condensed vapor composition stream (d) a condensed vapor composition purge stream (g) is withdrawn and at least partially reintroduced into step A), and wherein in step C) the condensed vapor composition stream (d) is compressed using a first pump (6), wherein in step C) the first screened vapor stream (e) is condensed by a condenser (7) yielding a filtered condensed vapor stream (i), which is reintroduced in step B) by spraying a spraying condensed vapor stream (j), wherein in step C) the filtered condensed vapor stream (i) is introduced into a filtered condensed vapor stream vessel (8) and the spraying condensed vapor stream (j) is withdrawn from the filtered condensed vapor stream vessel (8), wherein in step C) from the filtered condensed vapor stream vessel (8) a filtered condensed vapor purge stream (k) is withdrawn, wherein in step C) the spraying condensed vapor stream (j) is compressed using a second pump (9).

Preferably, the effluent stream (a) is withdrawn from a polymerization reaction step.

Third Preferred Embodiment of the Screening Process (FIG. 3)

The third preferred embodiment represents the combination of a process comprising step C) using a cyclone and a filter in that order represented by the first preferred embodiment and the additional steps of step C) for reusing the screened vapor streams of the cyclone and the filter.

Therefore, in summary, the third preferred embodiment of the invention as depicted in FIG. 3 relates to a process for screening polymer from an polymer-lean vapor stream, whereby the process comprises the steps of:

A) separating an effluent stream (a) the polymer and a first mixture of hydrocarbons into a polymer-rich stream (b) and the polymer-lean vapor stream (c);

B) spraying a condensed vapor composition stream (d) comprising a condensed vapor composition comprising a second mixture of hydrocarbons into the polymer-lean vapor stream (c);

C) screening the polymer-lean vapor stream (c) to obtain a screened condensed vapor composition stream (f) comprising the polymer and the condensed vapor composition, wherein step A) is carried out using a flash separator, wherein step C) is carried out using a cyclone (3) and a filter (4) in that order, wherein the vapor phase of the cyclone (3) is introduced into the filter (4) via a first screened vapor stream (e).

wherein in step C) the screened condensed vapor composition stream (f) is reintroduced in step B) via the condensed vapor composition stream (d), wherein in step C) the screened condensed vapor composition stream (f) is introduced into a condensed vapor composition vessel (5) and the condensed vapor composition stream (d) is withdrawn from the condensed vapor composition vessel (5), wherein in step C) from the condensed vapor composition stream (d) a condensed vapor composition purge stream (g) is withdrawn and at least partially reintroduced into step A), and wherein in step C) the condensed vapor composition stream (d) is compressed using a first pump (6), wherein in step C) a first screened vapor stream (e) withdrawn from the first screening device (3) and/or a second screened vapor stream (h) withdrawn from the second screening device (4) is/are condensed by a condenser (7) yielding a filtered condensed vapor stream (i), which is reintroduced in step B) by spraying a spraying condensed vapor stream (j), wherein in step C) the filtered condensed vapor stream (i) is introduced into a filtered condensed vapor stream vessel (8) and the spraying condensed vapor stream (j) is withdrawn from the filtered condensed vapor stream vessel (8), wherein in step C) from the filtered condensed vapor stream vessel (8) a filtered condensed vapor purge stream (k) is withdrawn, wherein in step C) the spraying condensed vapor stream (j) is compressed using a second pump (9).

Preferably, the effluent stream (a) is withdrawn from a polymerization reaction step.

Use of the Screening Assembly of the Present Invention

The present invention is also directed to the use of a screening assembly according to the invention for preventing fouling in a polymerization process.

The invention claimed is:

1. A process for screening polymer from a polymer-lean vapor stream, whereby the process comprises the steps of:

A) separating an effluent stream (a) comprising the polymer and a first mixture of hydrocarbons into a polymer-rich stream (b) and the polymer-lean vapor stream (c);

B) spraying a condensed vapor composition stream (d) comprising a condensed vapor composition comprising a second mixture of hydrocarbons into the polymer-lean vapor stream (c); and C) screening the polymer-lean vapor stream (c) to obtain a screened condensed vapor composition stream (f) comprising the polymer and the condensed vapor composition.

2. The process according to claim 1, wherein step C) is carried out using a cyclone (3) and a filter (4) in that order, wherein a vapor phase of the cyclone (3) is introduced into the filter (4) via a first screened vapor stream (e) and wherein a second screened vapor stream (h) is withdrawn from the filter (4).

3. The process according to claim 2, wherein in step C) the first screened vapor stream (e) and/or the second screened vapor stream (h) is/are condensed by a condenser (7) yielding a filtered condensed vapor stream (i), which is reintroduced in step B) by spraying a spraying condensed vapor stream (j).

4. The process according to claim 3, wherein in step C) the filtered condensed vapor stream (i) is introduced into a filtered condensed vapor stream vessel (8) and the spraying condensed vapor stream (j) is withdrawn from the filtered condensed vapor stream vessel (8).

5. The process according to claim 1, wherein step A) is carried out using a flash separator (2).

6. The process according to claim 1, wherein in step C) the screened condensed vapor composition stream (f) is reintroduced in step B) via the condensed vapor composition stream (d), and wherein in step C) the screened condensed vapor composition stream (f) is introduced into a condensed vapor composition vessel (5) and the condensed vapor composition stream (d) is withdrawn from the condensed vapor composition vessel (5).

7. A screening assembly comprising a separating device (2) fluidly connected to a conduit for an effluent stream (a) comprising a polymer and a first mixture of hydrocarbons, wherein the separating device (2) is configured to separate the effluent stream (a) into a polymer-rich stream (b) and a polymer-lean vapor stream (c), wherein the separating device (2) comprises an inlet, a first outlet for withdrawing the polymer-rich stream (b), and a second outlet for withdrawing the polymer-lean vapor stream (c); and a first screening device (3) connected to the second outlet of the separating device (2) via a conduit for the polymer-lean vapor stream (c), wherein the first screening device (3) is configured to spray condensed vapor composition comprising a second mixture of hydrocarbons into the polymer-lean vapor stream (c) via a conduit for a condensed vapor composition stream (d) and to screen a screened condensed vapor composition stream (f) comprising the polymer and the condensed vapor composition from the polymer-lean vapor stream (c), wherein the first screening device (3) comprises an inlet, a first outlet for withdrawing a condensed phase and a second outlet for withdrawing a vapor phase wherein the separating device is a flash separator or a gravity separator, and the first screening device is a cyclone.

8. The screening assembly according to claim 7, wherein the screening assembly further comprises a second screening device (4), which comprises an inlet, a first outlet for withdrawing a condensed phase and a second outlet for withdrawing a vapor phase wherein the second screening device is a gravity separator, a cyclone, or a filter.

9. The screening assembly according to claim 8, wherein the second screening device (4) is a filter and wherein the filter (4) is connected to the cyclone (3) via a conduit for a first screened vapor stream (e).

10. The screening assembly according to claim 8, wherein the first outlet for withdrawing a condensed phase of the second screening device (4) is connected to the condensed vapor composition stream (d) via a conduit for the screened condensed vapor composition stream (f).

11. The screening assembly according to claim 8, wherein the screening assembly further comprises a condenser (7) comprising an inlet and an outlet, wherein the inlet of the condenser (7) is connected to the second outlet of the first screening device (3) and/or to the second outlet of the second screening device (4), and wherein the outlet of the condenser (7) is connected to the inlet of the first (3) and/or the second screening device (4) via a conduit for the spraying condensed vapor stream (j) and wherein the first screening device (3) and/or the second screening device (4) is/are configured to spray the spraying condensed vapor stream (j) into the polymer-lean vapor stream (c), and wherein the screening assembly further comprises a filtered condensed vapor stream vessel (8), into which a filtered condensed vapor stream (i) connected to the outlet of the condenser (7) is introduced and from which the spraying condensed vapor stream (j) is withdrawn.

12. The screening assembly according to claim 7, wherein the first outlet for withdrawing a condensed phase of the first screening device (3) is connected to the condensed vapor composition stream (d) via a conduit for a screened condensed vapor composition stream (f).

13. The screening assembly according to claim 12, wherein the screening assembly further comprises a condensed vapor composition vessel (5), into which the screened condensed vapor composition stream (f) is introduced and from which the condensed vapor composition stream (d) is withdrawn.

14. A process for preventing fouling in a polymerization process, comprising:

screening an effluent stream (a) comprising a polymer and a first mixture of hydrocarbons with the screening assembly according to claim 7.

* * * * *